US011062019B2

(12) United States Patent
Yaffe et al.

(10) Patent No.: US 11,062,019 B2
(45) Date of Patent: Jul. 13, 2021

(54) SYSTEM AND METHOD FOR WEBPAGES SCRIPTS VALIDATION

(71) Applicant: TRAFFIC GUARD DG LTD, Tel Aviv (IL)

(72) Inventors: Dror Yaffe, Tel Aviv (IL); Gilad Cohen, Tel Aviv (IL)

(73) Assignee: TRAFFIC GUARD DG LTD., Tel-Aviv (IL)

( * ) Notice: Subject to any disclaimer, the term of this patent is extended or adjusted under 35 U.S.C. 154(b) by 155 days.

(21) Appl. No.: 16/307,148

(22) PCT Filed: Jun. 26, 2017

(86) PCT No.: PCT/IL2017/050704
§ 371 (c)(1),
(2) Date: Dec. 5, 2018

(87) PCT Pub. No.: WO2018/008013
PCT Pub. Date: Jan. 11, 2018

(65) Prior Publication Data
US 2019/0138711 A1   May 9, 2019

Related U.S. Application Data

(60) Provisional application No. 62/358,069, filed on Jul. 4, 2016.

(51) Int. Cl.
*G06F 21/51* (2013.01)
*G06F 16/23* (2019.01)
*G06F 16/958* (2019.01)

(52) U.S. Cl.
CPC .......... *G06F 21/51* (2013.01); *G06F 16/2379* (2019.01); *G06F 16/986* (2019.01); *G06F 2221/033* (2013.01)

(58) Field of Classification Search
CPC ...................................................... G06F 21/51
See application file for complete search history.

(56) References Cited

U.S. PATENT DOCUMENTS

| | | | |
|---|---|---|---|
| 8,578,499 B1 | 11/2013 | Zhu et al. | |
| 9,275,398 B1 | 3/2016 | Kumar et al. | |
| 10,079,854 B1* | 9/2018 | Scott | G06F 16/958 |
| 2005/0033810 A1 | 2/2005 | Malcolm | |
| 2006/0150256 A1 | 7/2006 | Fanton et al. | |
| 2007/0028185 A1 | 2/2007 | Bhogal et al. | |
| 2007/0107057 A1 | 5/2007 | Chander et al. | |
| 2007/0174915 A1 | 7/2007 | Gribble et al. | |
| 2009/0077383 A1 | 3/2009 | Monseignat et al. | |

(Continued)

FOREIGN PATENT DOCUMENTS

| | | |
|---|---|---|
| CN | 105119920 A | 12/2015 |
| KR | 20130110374 A | 10/2013 |

*Primary Examiner* — Simon P Kanaan (57) ABSTRACT

A method comprising: generating, by a processing unit, a plurality of requests for a given webpage, each request having at least one unique parameter value of one or more parameters that can affect the response of a web server; sending, by the processing unit, the requests to the web server; receiving, by the processing unit, in response to each request, a corresponding response; and generating, by a processing unit, by analysis of the responses, a list of identifiers of approved scripts to be executed by web-browsers on a plurality of client devices.

12 Claims, 4 Drawing Sheets

(56) References Cited

U.S. PATENT DOCUMENTS

| | | | |
|---|---|---|---|
| 2011/0173071 A1* | 7/2011 | Meyer | G06Q 30/02 |
| | | | 705/14.54 |
| 2011/0197177 A1* | 8/2011 | Mony | G06F 8/51 |
| | | | 717/115 |
| 2012/0216280 A1 | 8/2012 | Zorn et al. | |
| 2013/0160120 A1* | 6/2013 | Malaviya | G06Q 30/0244 |
| | | | 726/23 |
| 2013/0238970 A1 | 9/2013 | Getzin | |
| 2014/0229298 A1 | 8/2014 | Grun | |
| 2014/0237124 A1 | 8/2014 | Wagenen et al. | |
| 2015/0058141 A1 | 2/2015 | Yablonka et al. | |
| 2015/0163242 A1 | 6/2015 | Laidlaw et al. | |
| 2015/0341385 A1 | 11/2015 | Sivan et al. | |
| 2016/0063578 A1 | 3/2016 | Carasso | |
| 2016/0182537 A1* | 6/2016 | Tatourian | H04L 63/145 |
| | | | 726/23 |
| 2018/0330102 A1* | 11/2018 | Siman | G06F 16/2433 |
| 2019/0377877 A1* | 12/2019 | Johns | H04L 63/1441 |

\* cited by examiner

SYSTEM AND METHOD FOR WEBPAGES SCRIPTS VALIDATION

TECHNICAL FIELD

The invention relates to a system and method for webpages scripts validation.

BACKGROUND

In many cases nowadays, various scripts are injected to legitimate webpages, provided by various content providers, upon loading them on a client device (client device can be, for example, a desktop computer, a laptop computer, a smartphone, a tablet computer, a smart watch, or any other device that can display webpages). Some of the scripts are aimed at displaying content not approved by the content provider, such as unapproved advertisements that were not introduced by the content provider generating the webpage. Other scripts are aimed at retrieving information (e.g. credit card information, identity information, etc.) from the client device on which the webpage is loaded.

There is thus a need in the art for a new method and system for webpages scripts validation.

References considered to be relevant as background to the presently disclosed subject matter are listed below. Acknowledgement of the references herein is not to be inferred as meaning that these are in any way relevant to the patentability of the presently disclosed subject matter.

US Patent Application No. 2015/0058141 (Yablonka et al.) published on Feb. 26, 2015, discloses detecting and mitigating advertisement abuse software on a user device includes producing a digital document comprising a specification for a default advertisement and content. Advertisement abuse software for preventing the default advertisement from being displayed as specified on the user device is detected based on a test associated with one or more test elements. A specification for embedding an alternative advertisement in the digital document is generated, so as to prevent detection by advertisement abuse software, and a display of one of the default advertisement and the alternative advertisement is facilitated on the user device based on whether advertisement abuse software is detected.

GENERAL DESCRIPTION

In accordance with a first aspect of the presently disclosed subject matter there is provided a method comprising: providing, by a processing unit, a first list of identifiers of approved scripts approved for executing by web-browsers on a plurality of client devices and a second list of identifiers of rejected scripts not approved for executing by the web-browsers on the client devices, wherein an attempt to execute, by the web-browsers on the client devices, an approved script having an identifier included in the first list will be allowed and an attempt to execute, by the web-browsers on the client devices, a rejected script having an identifier included in the second list will be blocked; receiving, by the processing unit, from a given client device of the client devices, information of an unknown script executed on the given client by an approved script having an identifier included in the first list, the information including at least an identifier of the unknown script not included in the first list or in the second list; and updating, by the processing unit, the first list by inserting the identifier of the unknown script thereto upon approval of the unknown script by a user, or updating the second list by inserting the identifier of the unknown script thereto upon rejection of the unknown script by the user.

In some cases, the method further comprises sending, to at least one client device of the client devices, second information enabling determination if the unknown script is an approved script or a rejected script.

In some cases, the second information includes at least one update to the first list or to the second list.

In some cases, the second information includes at least one of an updated first list and an updated second list.

In some cases, the second information is sent in a response to a request by a given web-browser of the client device.

In some cases, the request is generated by javascript code executed on the client device, the javascript code preventing introduction of the rejected scripts into a Document Object Model (DOM) of the given webpage on the given web-browser, thereby preventing execution of the rejected scripts.

In some cases, the javascript code is designed to be executed by the web-browser before attempting execution of any of the rejected scripts.

In some cases, the first list is created by: generating a plurality of requests for a given webpage, each request having at least one unique parameter value of one or more parameters that can affect a corresponding response of a web server; sending the requests to the web server; receiving, in response to each request, a corresponding response; and generating, by analysis of the responses, the first list.

In accordance with a second aspect of the presently disclosed subject matter there is provided a method comprising: providing, by a processing unit, a first list of identifiers of approved scripts approved for executing by a web-browser on a client device and a second list of identifiers of rejected scripts not approved for executing by the web-browser on the client device, wherein an attempt to execute, by the web-browser on the client device, an approved script having an identifier included in the first list will be allowed and an attempt to execute, by the web-browser on the client device, a rejected script having an identifier included in the second list will be blocked; identifying an attempt of an approved script, having an identifier included in the first list, to introduce an unknown script into a Document Object Model (DOM) of a given webpage; and sending, by the processing unit, information of the unknown script to a server, thereby enabling the server to categorize the unknown script as an approved script or a rejected script.

In some cases, the method further comprises receiving, by the processing unit, from the server, second information enabling determination if the unknown script is an approved script or a rejected script.

In some cases, the second information includes at least one update to the first list or to the second list and wherein the processing unit is further configured to apply the update.

In some cases, the second information includes at least one of an updated first list and an updated second list.

In some cases, the second information is obtained from the server by javascript code received in a response to a web-page request by the web-browser of the client device.

In some cases, the javascript code prevents introduction of the rejected scripts into a Document Object Model (DOM) of the given webpage on the given web-browser, thereby preventing execution of the rejected scripts.

In some cases, the javascript code is executed by the web-browser before attempting execution of any of the rejected scripts.

In some cases, the first list is created by the server performing the following: generating a plurality of requests for a given webpage, each request having at least one unique parameter value of one or more parameters that can affect the response of a web server; sending the requests to the web server; receiving, in response to each request, a corresponding response; and generating, by analysis of the responses, the first list.

In accordance with a third aspect of the presently disclosed subject matter there is provided a method comprising: generating, by a processing unit, a plurality of requests for a given webpage, each request having at least one unique parameter value of one or more parameters that can affect the response of a web server; sending, by the processing unit, the requests to the web server; receiving, by the processing unit, in response to each request, a corresponding response; and generating, by a processing unit, by analysis of the responses, a list of identifiers of approved scripts to be executed by web-browsers on a plurality of client devices.

In accordance with a fourth aspect of the presently disclosed subject matter there is provided a system comprising at least one processing unit, the processing unit configured to: provide a first list of identifiers of approved scripts approved for executing by web-browsers on a plurality of client devices and a second list of identifiers of rejected scripts not approved for executing by the web-browsers on the client devices, wherein an attempt to execute, by the web-browsers on the client devices, an approved script having an identifier included in the first list will be allowed and an attempt to execute, by the web-browsers on the client devices, a rejected script having an identifier included in the second list will be blocked; receive from a given client device of the client devices, information of an unknown script executed on the given client by an approved script having an identifier included in the first list, the information including at least an identifier of the unknown script not included in the first list or in the second list; and update the first list by inserting the identifier of the unknown script thereto upon approval of the unknown script by a user, or updating the second list by inserting the identifier of the unknown script thereto upon rejection of the unknown script by the user.

In some cases, the processing unit is further configured to send, to at least one client device of the client devices, second information enabling determination if the unknown script is an approved script or a rejected script.

In some cases, the second information includes at least one update to the first list or to the second list.

In some cases, the second information includes at least one of an updated first list and an updated second list.

In some cases, the second information is sent in a response to a request by a given web-browser of the client device.

In some cases, the request is generated by javascript code executed on the client device, the javascript code preventing introduction of the rejected scripts into a Document Object Model (DOM) of the given webpage on the given web-browser, thereby preventing execution of the rejected scripts.

In some cases, the javascript code is designed to be executed by the web-browser before attempting execution of any of the rejected scripts.

In some cases, the first list is created by the processing unit performing the following: generating a plurality of requests for a given webpage, each request having at least one unique parameter value of one or more parameters that can affect a corresponding response of a web server; sending the requests to the web server; receiving, in response to each request, a corresponding response; and generating, by analysis of the responses, the first list.

In accordance with a fifth aspect of the presently disclosed subject matter there is provided a system comprising at least one processing unit, the processing unit configured to: provide a first list of identifiers of approved scripts approved for executing by a web-browser on a client device and a second list of identifiers of rejected scripts not approved for executing by the web-browser on the client device, wherein an attempt to execute, by the web-browser on the client device, an approved script having an identifier included in the first list will be allowed and an attempt to execute, by the web-browser on the client device, a rejected script having an identifier included in the second list will be blocked; identify an attempt of an approved script, having an identifier included in the first list, to introduce an unknown script into a Document Object Model (DOM) of a given webpage; and send information of the unknown script to a server, thereby enabling the server to categorize the unknown script as an approved script or a rejected script.

In some cases, the processing unit is further configured to receive, from the server, second information enabling determination if the unknown script is an approved script or a rejected script.

In some cases, the second information includes at least one update to the first list or to the second list and wherein the processing unit is further configured to apply the update.

In some cases, the second information includes at least one of an updated first list and an updated second list.

In some cases, the second information is obtained from the server by javascript code received in a response to a web-page request by the web-browser of the client device.

In some cases, the javascript code prevents introduction of the rejected scripts into a Document Object Model (DOM) of the given webpage on the given web-browser, thereby preventing execution of the rejected scripts.

In some cases, the javascript code is executed by the web-browser before attempting execution of any of the rejected scripts.

In some cases the first list is created by the server performing the following: generating a plurality of requests for a given webpage, each request having at least one unique parameter value of one or more parameters that can affect the response of a web server; sending the requests to the web server; receiving, in response to each request, a corresponding response; and generating, by analysis of the responses, the first list.

In accordance with a sixth aspect of the presently disclosed subject matter there is provided a system comprising at least one processing unit, the processing unit configured to: generate a plurality of requests for a given webpage, each request having at least one unique parameter value of one or more parameters that can affect the response of a web server; send the requests to the web server; receive in response to each request, a corresponding response; and generate, by analysis of the responses, a list of identifiers of approved scripts to be executed by web-browsers on a plurality of client devices.

In accordance with a seventh aspect of the presently disclosed subject matter there is provided a non-transitory computer readable storage medium having computer readable program code embodied therewith, the computer readable program code, executable by at least one processor of a content provider server to perform a method comprising: providing, by a processing unit, a first list of identifiers of approved scripts approved for executing by web-browsers on a plurality of client devices and a second list of identifiers of rejected scripts not approved for executing by the web-browsers on the client devices, wherein an attempt to execute, by the web-browsers on the client devices, an approved script having an identifier included in the first list will be allowed and an attempt to execute, by the web-browsers on the client devices, a rejected script having an identifier included in the second list will be blocked; receiving, by the processing unit, from a given client device of the client devices, information of an unknown script executed on the given client by an approved script having an identifier included in the first list, the information including at least an identifier of the unknown script not included in the first list or in the second list; and updating, by the processing unit, the first list by inserting the identifier of the unknown script thereto upon approval of the unknown script by a user, or updating the second list by inserting the identifier of the unknown script thereto upon rejection of the unknown script by the user.

In accordance with an eights aspect of the presently disclosed subject matter there is provided a non-transitory computer readable storage medium having computer readable program code embodied therewith, the computer readable program code, executable by at least one processor of a content provider server to perform a method comprising: providing, by a processing unit, a first list of identifiers of approved scripts approved for executing by a web-browser on a client device and a second list of identifiers of rejected scripts not approved for executing by the web-browser on the client device, wherein an attempt to execute, by the web-browser on the client device, an approved script having an identifier included in the first list will be allowed and an attempt to execute, by the web-browser on the client device, a rejected script having an identifier included in the second list will be blocked; identifying an attempt of an approved script, having an identifier included in the first list, to introduce an unknown script into a Document Object Model (DOM) of a given webpage; and sending, by the processing unit, information of the unknown script to a server, thereby enabling the server to categorize the unknown script as an approved script or a rejected script.

In accordance with a ninth aspect of the presently disclosed subject matter there is provided a non-transitory computer readable storage medium having computer readable program code embodied therewith, the computer readable program code, executable by at least one processor of a content provider server to perform a method comprising: generating, by a processing unit, a plurality of requests for a given webpage, each request having at least one unique parameter value of one or more parameters that can affect the response of a web server; sending, by the processing unit, the requests to the web server; receiving, by the processing unit, in response to each request, a corresponding response; and generating, by a processing unit, by analysis of the responses, a list of identifiers of approved scripts to be executed by web-browsers on a plurality of client devices.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "receiving", "updating", "sending", "preventing", "generating" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), any other electronic computing device, and/or any combination thereof.

The operations in accordance with the teachings herein may be performed by a computer specially constructed for the desired purposes or by a general purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIG. 5-8 may be executed. In embodiments of the presently disclosed subject matter one or more stages illustrated in FIG. 5-8 may be executed in a different order and/or one or more groups of stages may be executed simultaneously. FIGS. 1-4 illustrate a general schematic of the system architecture in accordance with an embodiment of the presently disclosed subject matter. Each module in FIGS. 1-4 can be made up of any combination of software, hardware and/or firmware that performs the functions as defined and explained herein. The modules in FIGS. 2-4 may be centralized in one location or dispersed over more than one location. In other embodiments of the presently disclosed subject matter, the system may comprise fewer, more, and/or different modules than those shown in FIGS. 2-4.

It is to be noted that reference is made throughout the description to Hypertext Transfer Protocol (HTTP), and to HyperText Markup Language (HTML), however this is by no means limiting. The presently disclosed subject matter can be applied also on other protocols and scripting languages, such as Wireless Markup Language (WML) script language and Wireless Application Protocol (WAP), e.g. for handset devices, etc.

Figure 1:
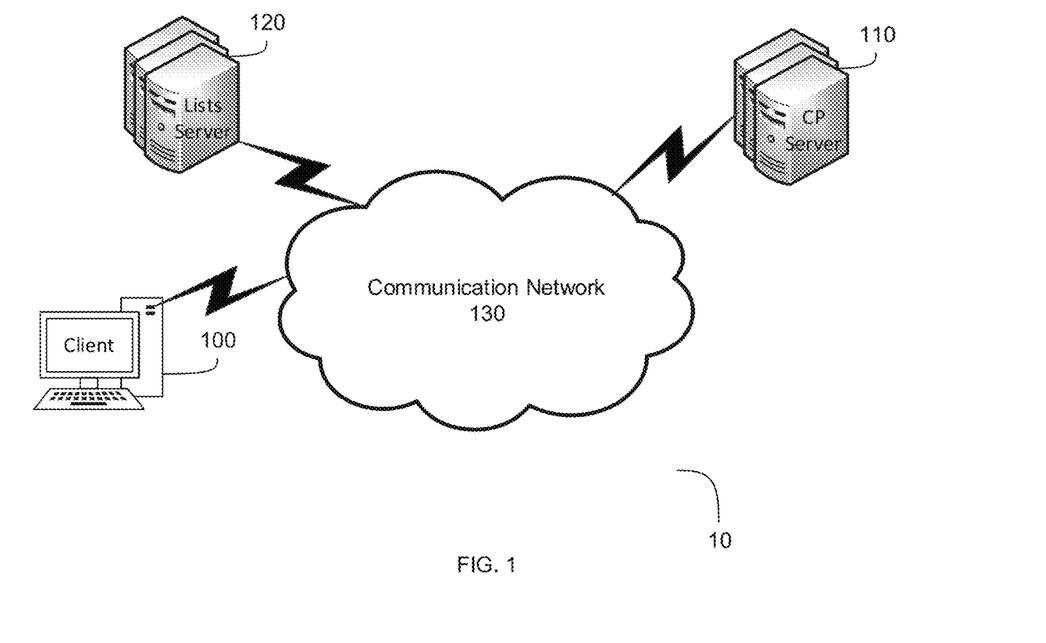
FIG. 1 is a schematic illustration of the environment of a system for webpages scripts validation, in accordance with the presently disclosed subject matter.

Bearing this in mind, attention is drawn to FIG. 1, showing a schematic illustration of the environment of a system for webpages scripts validation, in accordance with the presently disclosed subject matter.

According to certain examples of the presently disclosed subject matter, system environment 10 can comprise one or more client devices 100, one or more Content Provider (CP) servers 110 and one or more lists servers 120.

CP servers 110 can be web servers (e.g. a computer system that processes requests via Hypertext Transfer Protocol (HTTP)) configured to store content (hereinafter: "the content") to be provided to client devices 100 (client devices 100 can be, for example, desktop computers, laptop computers, smartphones, tablet computers, smart watches, or any other device that can display webpages) upon request, or optionally by a push mechanism. It is to be noted that the CP servers 110 can be part of a Content Delivery Network (CDN) or they can be fronted by a CDN layer. The content can include webpages including documents, files, scripts, etc., that can be sent to the client devices 100 via communication network 130 (e.g. any Internet Protocol (IP) based network, such as the Internet, an Intranet, etc.), where it can be rendered and presented to users of the client devices 100. The rendering and presentation of the content on displays of the client devices 130 can be performed utilizing appropriate software installed on the client devices 100, such as a web browser (e.g. Google's Chrome, Microsoft's Edge, Mozilla's Firefox, Apple's Safari, etc.).

In some cases, the content (e.g. the HyperText Markup Language (HTML) code representing a webpage, the webpage being the content) can include one or more scripts to be executed on the client device 100, and one or more of the scripts can be designed to execute one or more other scripts on the client device 100, and so on.

According to the presently disclosed subject matter, the scripts, and/or the other scripts, can be divided (e.g. in accordance with the teachings herein, including the approved scripts list generation process 500, the unknown script categorization process 700 and the scripts validation process 800) into three categories: (1) approved scripts, approved by a provider of the content (hereinafter: "content provider") for execution on client devices 100, (2) rejected scripts, rejected by the content provider from execution on client devices 100, and (3) unknown scripts, which are neither approved scripts, nor rejected scripts. According to the presently disclosed subject matter, an attempt to execute, by the web-browsers on the client devices 100, an approved script will be allowed and an attempt to execute, by the web-browsers on the client devices 100, a rejected script will be blocked, as further detailed herein, inter alia with reference to FIG. 8. An attempt to execute, by the web-browsers on the client devices 100, an unknown script can be either allowed or blocked, e.g. depending on a decision of the content provider.

The Lists servers 120 can be configured to categorize the scripts and the other scripts. The mechanism for categorizing the scripts (and/or the other scripts), and for allowing execution of scripts (and/or the other scripts) and/or blocking execution of scripts (and/or the other scripts) is further detailed herein, inter alia with reference to FIGS. 5, 7 and 8.

In some cases, various attempts can be made, by third party entities (e.g. web browser plug-ins, web browser extensions, web browser toolbars, or any other software that can introduce scripts into webpages loaded on a web browser installed on the client device 100), other than the content provider, to insert/inject various scripts into the content provided to the client devices 100. Such scripts can be aimed for example at obtaining information of the user of the client device 100, or for introducing various content (such as advertisements), not originating from the content provider and not approved by the content provider, into webpages displayed to the users of the client devices 100. Preventing execution of such scripts on the client devices 100 is thus desirable.

In accordance with the presently disclosed subject matter, script validation software/script (also referred to herein as "SVS") can be added to the content by the content providers. The SVS can be configured to execute, on the client device 100, before execution of any other script, other than the SVS, on the client device 100 (e.g. by inserting the SVS to the HTML code representing the content in a location that causes its execution before execution of any other script).

The SVS can be configured to capture attempts to introduce scripts (e.g. by using "AppendChild"/"BeforeInsert"/ "write" JavaScript functions, etc.)) into the Document Object Module (DOM) of the webpage loaded by the web browser installed on the client device 100. The SVS can enable introduction of captured scripts that are approved scripts into the DOM and block introduction of captured scripts that are rejected scripts into the DOM. As for unknown scripts, the SVS can be configured to either enable or block their introduction into the DOM. A more detailed explanation of the SVS operation is provided herein, inter alia with reference to FIG. 8.

In some cases, the SVS can be further configured to provide (optionally in real-time) a lists server 120 with script identification information, which includes information enabling identification of any script whose execution on the client device 100 is attempted. In some cases, the script identification information can include the Uniform Resource Locator (URL) associated with the script, various information relating to the client device 100 (e.g. client device's 100 Internet Protocol (IP) address, type of operating system executing on the client device 100, type of web-browser executing the script, languages defined on the client device 100, Geographical location of the client device 100, etc.), information of a hierarchy of scripts that introduced the script (as each script can be introduced by another script that was executed before it), etc. In some cases, the SVS can be configured to provide (optionally in real-time) the lists server 120 with script identification information enabling identification of scripts, that are not approved scripts, whose execution on the client device 100 is attempted. In some cases, the SVS can be configured to provide (optionally in real-time) the lists server 120 with script identification information enabling identification of script that meets certain criteria (e.g. a script that causes opening of a new web browser window on the client device 100, a script that causes any kind of unauthorized behavior, unauthorized by the content provider, on the client device 100, a script that is suspected to be an internet bot (hereinafter: "bot") designed to retrieve various data (e.g. scrape data including pricing data of products displayed on the webpage) from the webpage in an automatic manner (e.g. a script that executes a JavaScript function "getElementById" for an element pre-identified, e.g. by the content provider, as a pricing element indicative of a price of a certain product to be displayed on the webpage), etc.) whose execution on the client device 100 is attempted. Such information, provided by the SVS to the lists server 120, can then be processed and/or analyzed. One exemplary purpose of such analysis is to identify unauthorized use of scripts by third parties that are allowed to introduce scripts into the content provided by the content provider (e.g. publishers that are allowed to introduce advertisements into the content). Another exemplary purpose of such analysis is to count the number of times a certain script was executed on the various client devices 100 for authenticating usage reports provided by advertisers authorized by the content provider to provide advertisements within the content. Another exemplary purpose of such analysis is for identifying unauthorized bots whose execution on the webpage is attempted for obtaining information from the webpage in an automatic manner.

It is to be further noted that in some cases, the SVS can be configured to enforce various pre-defined rules. For example, the SVS can be configured to prevent execution of scripts that meets certain criteria (e.g. a script that causes opening of a new web browser window on the client device 100, a script that causes any kind of unauthorized behavior, unauthorized by the content provider, on the client device 100, a script that is suspected to be an internet bot (hereinafter: "bot") designed to retrieve various data (e.g. scrape data including pricing data of products displayed on the webpage) from the webpage in an automatic manner (e.g. a script that executes a JavaScript function "getElementById" for an element pre-identified, e.g. by the content provider, as a pricing element indicative of a price of a certain product to be displayed on the webpage), etc.) whose execution on the client device 100 is attempted.

Figure 5:
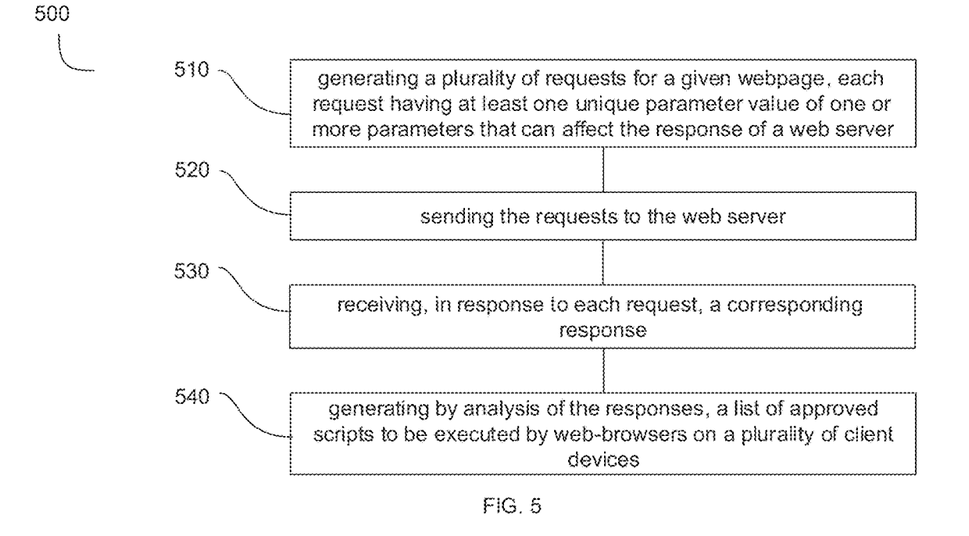
FIG. 5 is a flowchart illustrating one example of a sequence of operations carried out for generating a list of approved scripts, in accordance with the presently disclosed subject matter.

It is to be still further noted that in some cases, the SVS can be configured to compare various components introduced into the DOM with a list of authorized components (e.g. generated by lists server 120 in a process similar to the approved scripts list generation process 500), and validate that such component does not lead to an unauthorized behavior (e.g. opening of a new web browser window, redirecting to another webpage, providing unauthorized content such as adult advertising, etc.).

Figure 2:
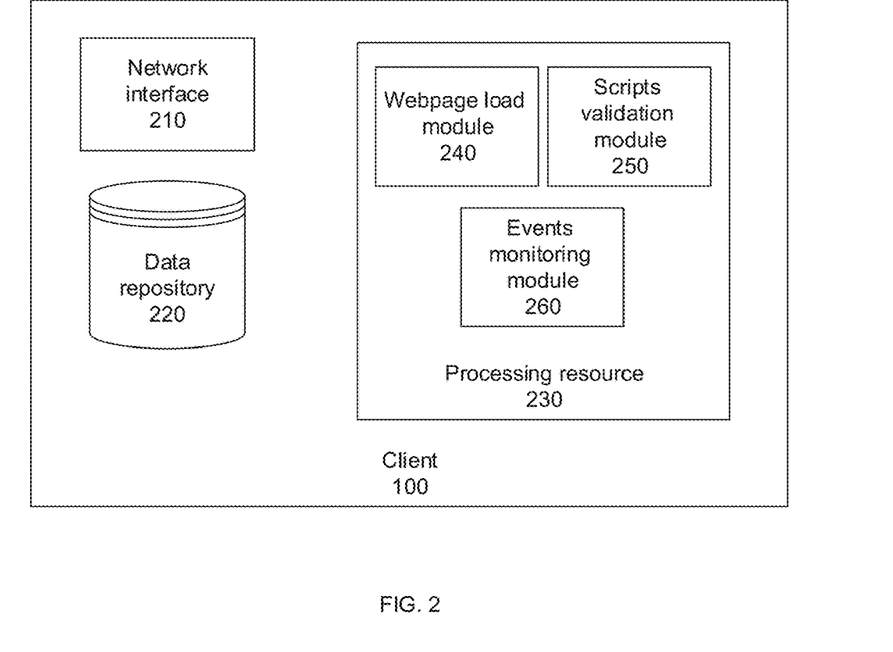
FIG. 2 is a block diagram schematically illustrating one example of a client device, in accordance with the presently disclosed subject matter.

Attention is now drawn to FIG. 2, showing a block diagram schematically illustrating one example of a client device, in accordance with the presently disclosed subject matter.

Figure 7:
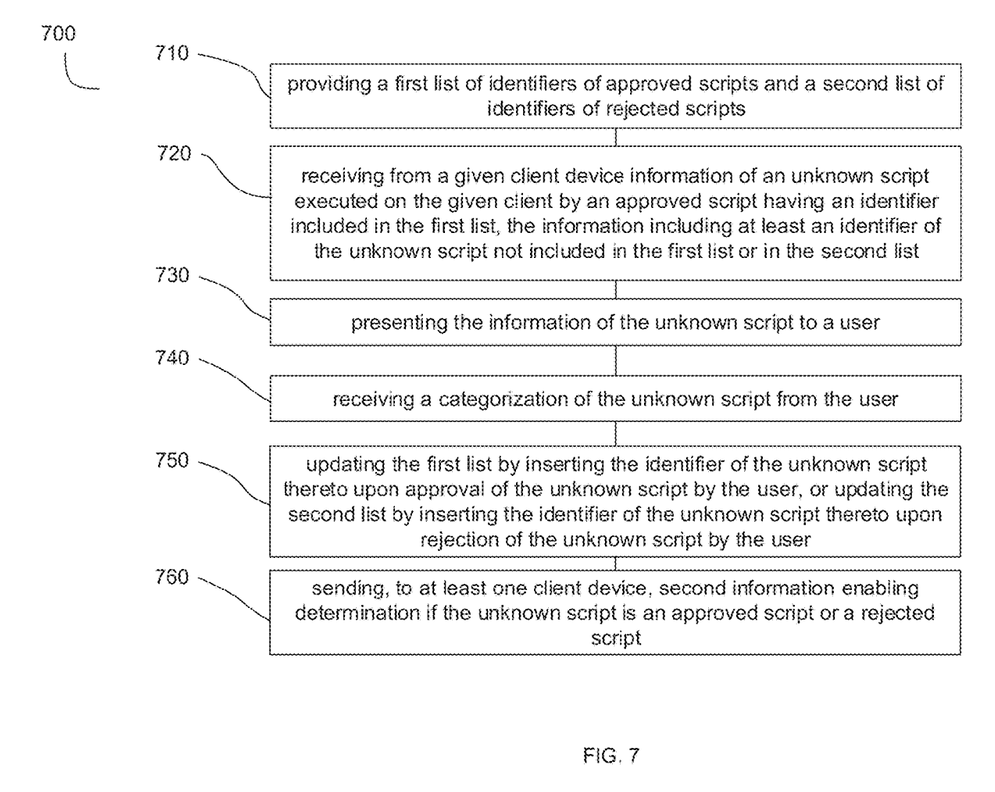
FIG. 7 is a flowchart illustrating one example of a sequence of operations carried out for categorizing an unknown script, in accordance with the presently disclosed subject matter.

According to certain examples of the presently disclosed subject matter, client device 100 includes a network interface 210, enabling connecting the client device 100 to communication network 130 and enabling it to send and receive data sent thereto through the communication network 130, including sending webpages requests, and/or receiving responses to the webpages requests from the CP server 110, and/or sending information of unknown scripts to the lists server 120, and/or receiving information enabling determination if the unknown script is an approved script or a rejected script from the lists server 120, as further detailed herein, inter alia with reference to FIG. 7.

The client device 100 can further comprise or be otherwise associated with a data repository 220 (e.g. a database, a storage system, a memory including Read Only Memory—ROM, Random Access Memory—RAM, or any other type of memory, etc.) configured to store data, including, inter alia, a first list of identifiers of approved scripts and a second list of identifiers of rejected scripts, etc. In some cases, data repository 220 can be further configured to enable retrieval and/or update and/or deletion of the stored data. It is to be noted that in some cases, data repository 220 can be distributed.

The client device 100 further comprises a processing unit 230. Processing unit 230 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant client device 100 resources and for enabling operations related to client device 100 resources.

The processing unit 230 can comprise one or more of the following modules: webpage load module 240, script validation module 250 and events monitoring module 260.

According to some examples of the presently disclosed subject matter, the webpage load module 240 can be configured to receive HTML code representing a webpage, render the code and display the webpage on a display (not shown) of the user device 100. In some cases, the webpage load module 240 can be a web browser (e.g. Google's Chrome, Microsoft's Edge, Firefox, or any other software designed to display webpages to the users of the user devices on which they are installed).

Figure 8:
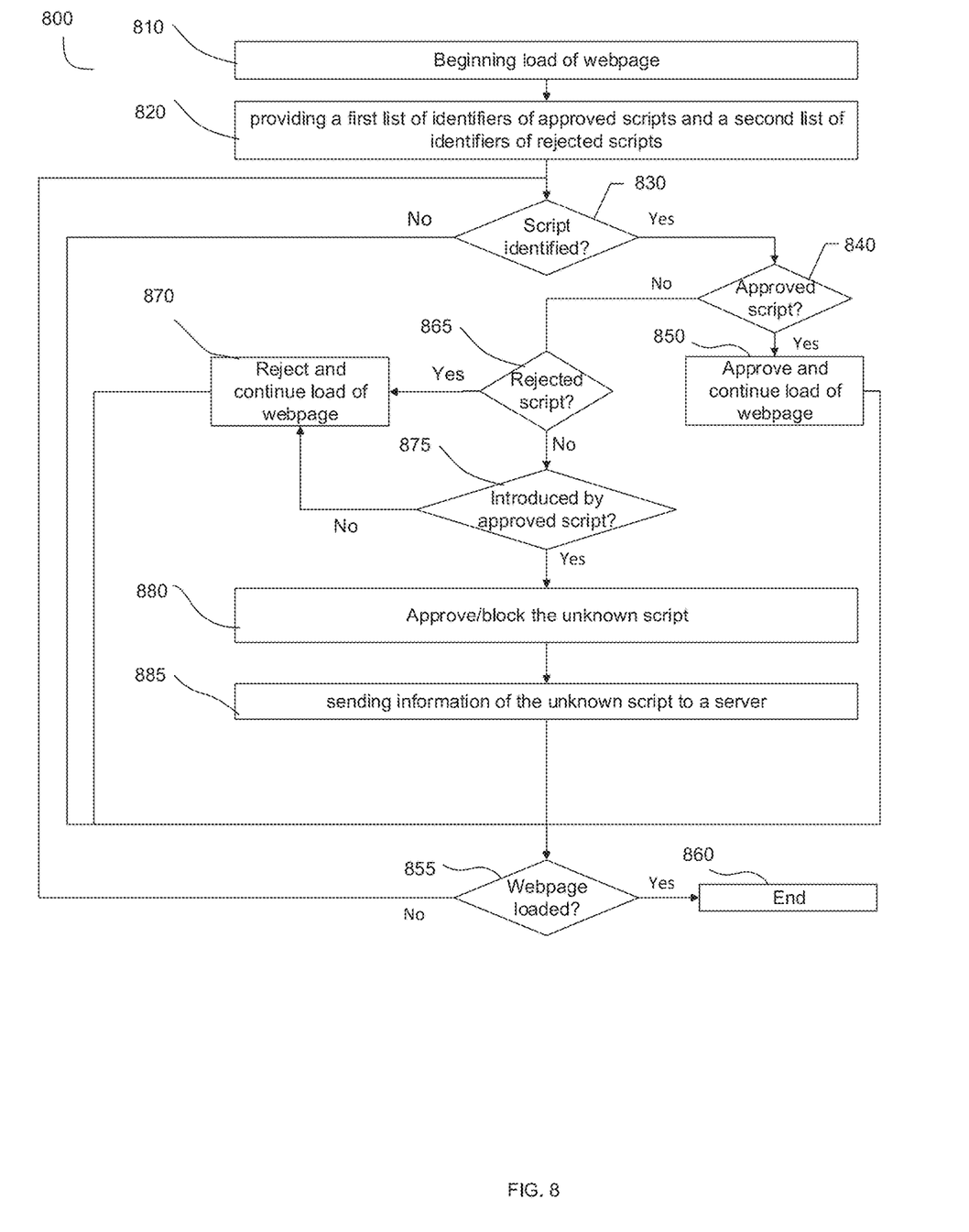
FIG. 8 is a flowchart illustrating one example of a sequence of operations carried out for loading a webpage, in accordance with the presently disclosed subject matter.

Script validation module 250 can be configured to control execution of scripts on the client device 100, as further detailed herein, inter alia with reference to FIG. 8. In some cases, the script validation module 250 can be implemented by the SVS, which, as indicated herein, is a script incorporated within the content provided by the content provider, or more specifically, a JavaScript code incorporated into the webpage being loaded by the webpage load module 240.

Figure 3:
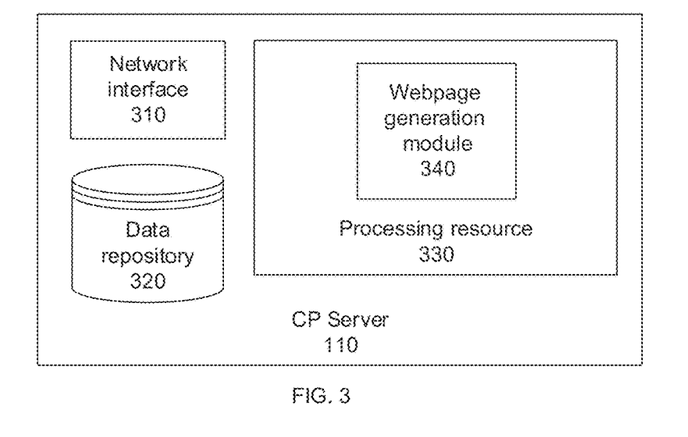
FIG. 3 is a block diagram schematically illustrating one example of a content provider server, in accordance with the presently disclosed subject matter.
Figure 6:
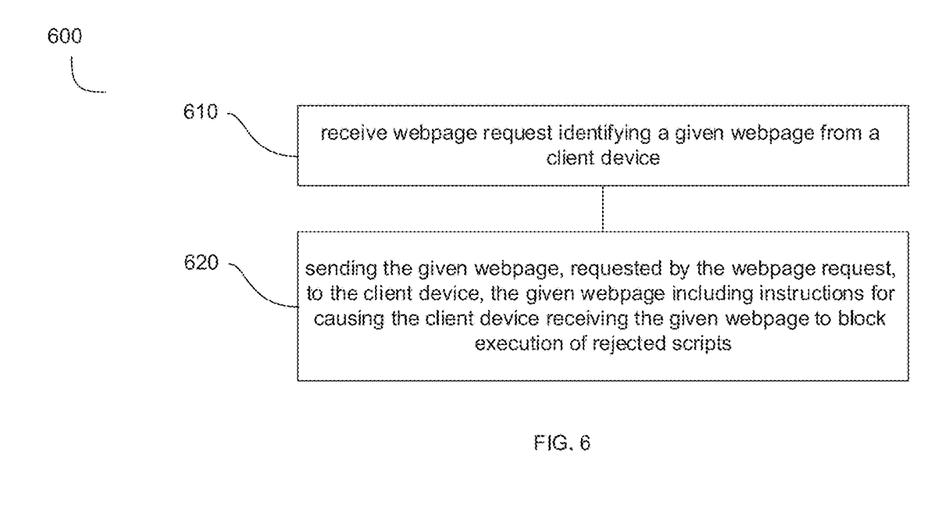
FIG. 6 is a flowchart illustrating one example of a sequence of operations carried out for providing a webpage to a client device, in accordance with the presently disclosed subject matter.

Events monitoring module 260 can be configured to provide the lists server 110 with information enabling identification of all or part of the scripts whose execution on the client device 100 is attempted, for the purpose of processing and/or analysis, as detailed herein, inter alia with respect to FIGS. 1, 3 and 6.

Turning to FIG. 3, there is shown a block diagram schematically illustrating one example of a content provider server, in accordance with the presently disclosed subject matter.

According to certain examples of the presently disclosed subject matter, CP server 110 includes a network interface 310, enabling connecting the CP server 110 to communication network 130 and enabling it to send and receive data sent thereto through the communication network 130, including receiving webpages requests from client devices 100, and/or sending responses to the webpages requests to the client devices 100, as further detailed herein, inter alia with reference to FIG. 6.

The CP server 110 can further comprise or be otherwise associated with a data repository 320 (e.g. a database, a storage system, a memory including Read Only Memory—ROM, Random Access Memory—RAM, or any other type of memory, etc.) configured to store data, including, inter alia, webpages, documents, files, scripts etc. In some cases, data repository 320 can be further configured to enable retrieval and/or update and/or deletion of the stored data. It is to be noted that in some cases, data repository 320 can be distributed.

The CP server 110 further comprises a processing unit 330. Processing unit 330 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant server 110 resources and for enabling operations related to server 110 resources.

The processing unit 330 can comprise a webpage generation module 340 configured to generate HTML code representing a webpage (and including the SVS) upon a request from a client device 100 and send the HTML code to the requesting client device 100, as further detailed herein, inter alia with reference to FIG. 6.

Figure 4:
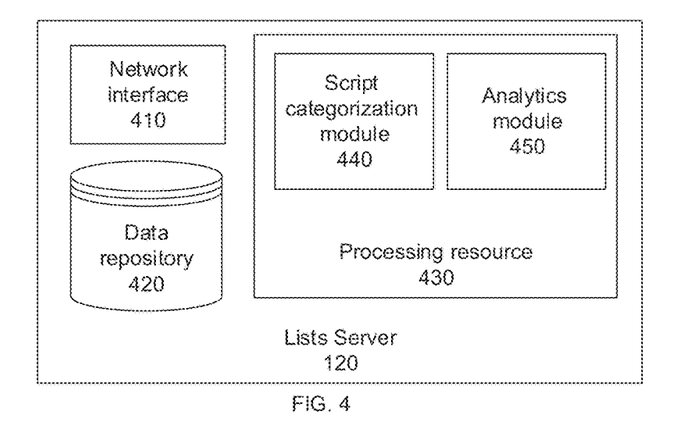
FIG. 4 is a block diagram schematically illustrating one example of a lists server, in accordance with the presently disclosed subject matter.

In FIG. 4 there is shown a block diagram schematically illustrating one example of a lists server, in accordance with the presently disclosed subject matter.

According to certain examples of the presently disclosed subject matter, lists server 120 includes a network interface 410, enabling connecting the lists server 120 to communication network 130 and enabling it to send and receive data sent thereto through the communication network 130, including receiving information of various scripts executed on the various client devices 100, receiving information of unknown scripts from the client devices 100, and/or sending information enabling determination if the unknown script is an approved script or a rejected script to the client devices 100, as further detailed herein, inter alia with reference to FIGS. 7 and 8.

The lists server 120 can further comprise or be otherwise associated with a data repository 420 (e.g. a database, a storage system, a memory including Read Only Memory—ROM, Random Access Memory—RAM, or any other type of memory, etc.) configured to store data, including, inter alia, scripts identification information and scripts categorization information (including, for example, a list of approved scripts and/or a list of rejected scripts, as further detailed herein), information of various scripts executed on the various client devices 100, etc. In some cases, data repository 420 can be further configured to enable retrieval and/or update and/or deletion of the stored data. It is to be noted that in some cases, data repository 420 can be distributed.

The lists server 120 further comprises a processing unit 430. Processing unit 430 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant lists server 120 resources and for enabling operations related to lists server 120 resources.

The processing unit 430 can comprise one or more of the following modules: a script categorization module 440 and an analytics module 450.

According to some examples of the presently disclosed subject matter, the script categorization module 440 can be configured to create a list of approved scripts to be executed by web-browsers on a plurality of client devices, as further detailed herein, inter alia with reference to FIG. 5. Additionally, or alternatively, script categorization module 440 can be configured to categorize an unknown script as an approved script or as a rejected script, as further detailed herein, inter alia with reference to FIG. 7.

The analytics module 450 can be configured to analyze information indicative of execution of various scripts on the client devices 100, as further detailed herein, inter alia with reference to FIGS. 1, 2 and 8.

It is to be noted that in some cases the lists server 120 can be part of the CP server 110 and vice versa.

Attention is now drawn to FIG. 5, a flowchart illustrating one example of a sequence of operations carried out for generating a list of approved scripts, in accordance with the presently disclosed subject matter.

According to some examples of the presently disclosed subject matter, list server 120 can be configured to execute an approved scripts list generation process 500, e.g. utilizing script categorization module 440.

In order to generate a list of the approved scripts list, the approved scripts list generation process 500 attempts to obtain information of all scripts that can potentially be included in a response to a request for a given webpage that can be provided by the content provider. It is to be noted in this regard, that the CP server 110 can generate different responses to different requests for a given webpage, although all of the different requests and all of the different responses all refer to the same given webpage, having an identical URL. The changes between the responses to various requests for a given webpage can result, for example, from differences of operating systems and/or web browsers installed on a requesting client device 100 requesting the webpage, or from a language defined by the requesting client device 100, or from a geographical location of the requesting client device 100, etc. It is to be noted that the CP server 110 receives, as part of the request received from a client device 100, various parameters, based on which the CP server 110 response is generated.

For the purpose of generating the approved scripts list, lists server 120 can be configured to generate a plurality of requests for a given webpage, each request having at least one unique parameter value of one or more parameters that can affect the response of a web server (block 510). The webpage request comprises a URL associated with the webpage, and one or more additional parameters values, such as an Internet Protocol (IP) address of a device from which the request originates, information of the operating system installed on the client device 100 from which the request originates and/or information of the web browser installed on the client device 100 from which the request originates, an indication of a requested content language, geographical location of the client device 100, cookies available on the client device 100, etc. It is to be noted that in some cases, the plurality of requests can be generated such that the responses to the requests will cover all possible response scenarios. In some cases the plurality of requests can be generated such that the combination of responses to the requests will include all scripts introduced into the content by the content provider.

Lists server 120 then sends the requests generated at block 410 to the CP server 110 (block 520) where the requests are processed (utilizing the URL and the additional parameters values) and suitable responses (i.e. HTML code representing webpages, optionally including calls to at least one script) are generated and sent back to the lists server, which receives, in response to each request, a corresponding response (block 530).

Lists server 120 utilizes the responses for generating, by analysis of thereof, a list of identifiers of approved scripts to be executed by web-browsers on a plurality of client devices 100 (block 540). In some cases, the list of identifiers of approved scripts generated at block 440 includes information enabling identification of scripts included in the responses (e.g. script name, script URL, etc.), as each such response is generated by the CP server 110 and therefore each script included therein is introduced by the content provider itself (meaning that such scripts are intended to be included as part of the content, and they are not introduced by unauthorized third parties).

It is to be noted that the approved scripts list generation process 500 can be executed periodically or continuously as the given webpage may be changed by the content provider and additional scripts can be introduced.

It is to be noted that, with reference to FIG. 5, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Turning to FIG. 6, there is shown a flowchart illustrating one example of a sequence of operations carried out for providing a webpage to a client device, in accordance with the presently disclosed subject matter;

According to some examples of the presently disclosed subject matter, CP server 110 can be configured to execute a webpage generation process 600, utilizing webpage generation module 340.

For this purpose, CP server 110 can be configured to receive a webpage request identifying a given webpage, from a client device 100 (block 610), and send the given webpage, requested by the webpage request, to the requesting client device 100 (block 620). The given webpage sent by the CP server 110 to the client device 100 can include the SVS. As indicated herein, the SVS is a script configured to execute, on the client device 100, before execution of any other script, other than the SVS. The SVS can be configured to capture attempts to introduce scripts (by identifying such attempts that usually include using "AppendChild" and/or "BeforeInsert" and/or "write" JavaScript functions, etc.) into the Document Object Module (DOM) of the webpage loaded by the web browser installed on the client device 100. The SVS can enable introduction of captured scripts that are approved scripts into the DOM and block introduction of captured scripts that are rejected scripts into the DOM. As for unknown scripts, the SVS can be configured to either enable or block their introduction into the DOM. A more detailed explanation of the SVS operation is provided herein, inter alia with reference to FIG. 8.

It is to be noted that the given webpage can be represented by HTML code and the SVS is included in the HTML code, e.g. as JavaScript or any other type of code, that can be executed by a web browser installed on the client device 130. In some cases, the SVS can be configured to communicate with the lists server 120, e.g. for retrieving the list of identifiers of approved scripts and the list of identifiers of rejected scripts, as further detailed herein, inter alia with reference to FIG. 8.

It is to be noted that, with reference to FIG. 6, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

FIG. 7 is a flowchart illustrating one example of a sequence of operations carried out for categorizing an unknown script, in accordance with the presently disclosed subject matter.

According to some examples of the presently disclosed subject matter, lists server 120 can be configured to execute an unknown script categorization process 700, utilizing script categorization module 440.

For this purpose, lists server 120 can be configured to provide a first list of identifiers of approved scripts and a second list of identifiers of rejected scripts (block 710). The first list of identifiers of approved scripts can be the list originally populated by the approved scripts list generation process 500. The second list of identifiers of rejected scripts can optionally be empty.

Lists server 120 can receive, from a given client device 100 (e.g. utilizing the SVS executing on the given client device), information of an unknown script introduced for execution on the given client device 100 by an approved script having an identifier included in the first list. The information includes at least an identifier of the unknown script not included in the first list or in the second list, and optionally information of a hierarchy of scripts that introduced the unknown script (what are the scripts that caused an attempt to introduce the unknown script to the DOM) (block 720). It is to be noted that any script not included in the first list, whose introduction for execution on the client device 100 is attempted can be blocked by the SVS executing on the client device 100. However, in some cases, scripts included in the first list (i.e. approved scripts), attempt to introduce other scripts for execution by the web browser installed on the client device 100. In some cases, it is desirable to allow such unknown scripts, introduced by approved scripts, to be introduced for execution by the web browser installed on the client device 100.

Regardless of the introduction of such unknown scripts for execution by the web browser installed on the client device 100, or blocking such unknown scripts execution, lists server 120 can be configured to present the information of the unknown script to a user (e.g. a person representing the content provider) (block 730) and to receive a categorization of the unknown script therefrom (block 740). In some cases, the user can decide to approve such unknown script, thereby enabling future execution thereof on client devices 100 loading the content provider's webpage, and in other cases, the user can decide to reject such unknown script, thereby disabling future execution thereof on client devices 100 loading the content provider's webpage.

Lists server updates the first list by inserting the identifier of the unknown script thereto upon approval of the unknown script by the user, or update the second list by inserting the identifier of the unknown script thereto upon rejection of the unknown script by the user (block 750). It is to be noted that the first list and the second list can be stored on the data repository 420.

In some cases, lists server 120 can be further configured send, to at least one client device 100, and optionally to the given client device 100, information enabling determination if the unknown script is an approved script or a rejected script based on the input received from the user at block 740 (block 760). It is to be noted that in some cases, such information will be sent upon a future request from a client device 100 to receive the first list and the second list.

It is to be noted that, with reference to FIG. 7, some of the blocks can be integrated into a consolidated block or can be broken down to a few blocks and/or other blocks may be added. Furthermore, in some cases, the blocks can be performed in a different order than described herein (for example, block 760 can be performed before block 750, etc.). It is to be further noted that some of the blocks are optional. It should be also noted that whilst the flow diagram is described also with reference to the system elements that realizes them, this is by no means binding, and the blocks can be performed by elements other than those described herein.

Turning to FIG. 8, there is shown a flowchart illustrating one example of a sequence of operations carried out for loading a webpage, in accordance with the presently disclosed subject matter.

According to some examples of the presently disclosed subject matter, client device 100 can be configured to execute a scripts validation process 800, utilizing script validation module 250. The script validation module 250 can inter alia include the SVS.

For this purpose, client device 100 can be configured to begin load of a given webpage, e.g. utilizing webpage load module 240 (block 810). The given webpage, is a webpage generated by the webpage generation module 340 in accordance with the webpage generation process 600, and it includes the SVS, that is loaded by the web browser installed on the client device 100 before any other script is executed on the client device 100.

The SVS can be configured to provide a first list of identifiers of approved scripts and optionally a second list of identifiers of rejected scripts (block 820). In some cases, the first list and the second list can be obtained by the SVS from the lists server 120, by indicating the given webpage being loaded on the client device 100 and obtaining the first list and the second list associated with the given webpage therefrom.

As indicated herein, the SVS is configured to capture attempts to introduce scripts (e.g. by identifying such attempts that usually include using "AppendChild" and/or "BeforeInsert" and/or "write" JavaScript functions, etc.) into the Document Object Module (DOM) of the webpage loaded by the web browser installed on the client device 100.

The SVS can continuously monitor the loading webpage and check if introduction of a script into the DOM is identified (block 830). If no script introduction is identified the SVS can be configured to check if the webpage finished loading (block 855) and if so—the process ends (block 860). If the webpage did not finish loading, the process returns to block 830.

If, however, an attempt to introduction a script into the DOM is identified at block 830, the SVS can be configured to check if the script whose introduction into the DOM is attempted is an approved script (block 840). The check can be made by comparing an identifier of the script with the first list of identifiers of approved scripts obtained at block 820—and if a matching script identifier is found on the first list—the script is an approved script. If the script is an approved script—the SVS can approve introduction of the script into the DOM and continue loading the webpage (block 850). The SVS can be configured to check if the webpage finished loading (block 855) and if so—the process ends (block 860). If the webpage did not finish loading, the process returns to block 830.

If the script, whose introduction into the DOM is identified at block 830, is not an approved script, the SVS can be configured to check if the script is a rejected script (block 865). The check can be made by comparing an identifier of the script with the second list of identifiers of rejected scripts obtained at block 820—and if a matching script identifier is found on the second list—the script is a rejected script. If the script is a rejected script—the SVS can block its introduction into the DOM (e.g. by blocking the "AppendChild" and/or "BeforeInsert" and/or "write" JavaScript functions utilized to introduce the script into the DOM) and continue loading the webpage (block 870). The SVS can be configured to check if the webpage finished loading (block 855) and if so—the process ends (block 860). If the webpage did not finish loading, the process returns to block 830.

If the script, whose introduction into the DOM is identified at block 830, is not an approved script and not a rejected script, the SVS can be configured to check if the attempt to introduce the unknown script into the DOM is made by an approved script having an identifier included in the first list (block 875). If not—the SVS can optionally be configured to block its introduction into the DOM and continue loading the webpage (block 870). The SVS can be configured to check if the webpage finished loading (block 855) and if so—the process ends (block 860). If the webpage did not finish loading, the process returns to block 830.

If the attempt to introduce the unknown script into the DOM is made by an approved script having an identifier included in the first list, the SVS can be configured to allow introduction of the unknown script into the DOM (block 880). It is to be noted that in other cases the SVS can be configured to block introduction of the unknown script into the DOM at block 880, even if the attempt to introduce the unknown script into the DOM is made by an approved script, instead of allowing its introduction into the DOM.

The SVS can be further configured to send information of the unknown script to the lists server 120 (block 885), that can perform the unknown script categorization process 700 for categorizing the unknown script as an approved script or a rejected script.

In some cases, the SVS can optionally be further configured to receive from the lists server 120, information enabling determination if the unknown script is an approved script or a rejected script, e.g. for future use when the SVS encounters such unknown script again. It is to be noted that in some cases, the information enabling determination if the unknown script is an approved script or a rejected script is only received upon a future loading for the given webpage on the client device 100 (i.e. only when step 820 is performed by the SVS when the webpage is being loaded).

Finally, the SVS can be further configured to check if the webpage finished loading (block 855) and if so—the process ends (block 860). If the webpage did not finish loading, the process returns to block 830.

It is to be noted that in some cases, as indicated herein, the events monitoring module 260 (that can optionally be implemented as part of the SVS) can be further configured to provide (optionally in real-time) the lists server 120 with script identification information, which includes information enabling identification of any script whose execution on the client device 100 is attempted. In some cases, the script identification information can include the Uniform Resource Locator (URL) associated with the script, various information relating to the client device 100 (e.g. client device's 100 Internet Protocol (IP) address, type of operating system executing on the client device 100, type of web-browser executing the script, languages defined on the client device 100, Geographical location of the client device 100, etc.), information of a hierarchy of scripts that introduced the script (as each script can be introduced by another script that was executed before it), etc. In some cases, the SVS can be configured to provide (optionally in real-time) the lists server 120 with script identification information enabling identification of scripts, that are not approved scripts, whose execution on the client device 100 is attempted. In some cases, the SVS can be configured to provide (optionally in real-time) the lists server 120 with script identification information enabling identification of script that meets certain criteria (e.g. a script that causes opening of a new web browser window on the client device 100, etc.) whose execution on the client device 100 is attempted. Such information, provided by the SVS to the lists server 120, can then be processed and/or analyzed, e.g. utilizing analytics module 450. One exemplary purpose of such analysis is to identify unauthorized use of scripts by third parties that are allowed to introduce scripts into the content provided by the content provider (e.g. publishers that are allowed to introduce advertisements into the content). Another exemplary purpose of such analysis is to count the number of times a certain script was executed on the various client devices 100 for authenticating usage reports provided by advertisers authorized by the content provider to provide advertisements within the content.

It is to be noted that, with reference to FIG. 8, some of the blocks can be integrated into a consolidated block or can be broken down to a few blocks and/or other blocks may be added. Furthermore, in some cases, the blocks can be performed in a different order than described herein (for example, block 885 can be performed before block 880, etc.). It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

What is claimed is:

1. A method comprising:
   providing, by a processing unit, a first list of identifiers of approved scripts approved for executing by web-browsers on a plurality of client devices and a second list of identifiers of rejected scripts not approved for executing by the web-browsers on the client devices, wherein an attempt to execute, by the web-browsers on the client devices, an approved script having an identifier included in the first list will be allowed and an attempt to execute, by the web-browsers on the client devices, a rejected script having an identifier included in the second list will be blocked;
   in response to execution of a script validation software on any given client device of the client devices:
      sending the first list and the second list to the given client device;
      receiving, by the processing unit, from the given client device, information of an unknown script executed on the given client by an approved script having an identifier included in the first list, the information including at least an identifier of the unknown script not included in the first list or in the second list; and
      updating, by the processing unit, the first list by inserting the identifier of the unknown script thereto upon approval of the unknown script by a user, or updating the second list by inserting the identifier of the unknown script thereto upon rejection of the unknown script by the user.

2. The method of claim 1 further comprising sending, to at least one client device of the client devices, second information enabling determination if the unknown script is an approved script or a rejected script, wherein the second information includes (a) at least one update to the first list or to the second list, or (b) at least one of an updated first list or an updated second list.

3. The method of claim 2 wherein the second information is sent in a response to a request by a given web-browser of the client device, wherein the request is generated by javascript code executed on the client device, the javascript code preventing introduction of the rejected scripts into a Document Object Model (DOM) of the given webpage on the given web-browser, thereby preventing execution of the rejected scripts, and wherein the javascript code is designed to be executed by the web-browser before attempting execution of any of the rejected scripts.

4. The method of claim 1 wherein the first list is created by: generating a plurality of requests for a given webpage, each request having at least one unique parameter value of one or more parameters that can affect a corresponding response of a web server;
   sending the requests to the web server;
   receiving, in response to each request, a corresponding response; and
   generating, by analysis of the responses, the first list.

5. A method comprising:
providing, by a processing unit, a first list of identifiers of approved scripts approved for executing by a web-browser on a client device and a second list of identifiers of rejected scripts not approved for executing by the web-browser on the client device, wherein an attempt to execute, by the web-browser on the client device, an approved script having an identifier included in the first list will be allowed and an attempt to execute, by the web-browser on the client device, a rejected script having an identifier included in the second list will be blocked;
identifying an attempt of an approved script, having an identifier included in the first list, to introduce an unknown script into a Document Object Model (DOM) of a given webpage; and
sending, by the processing unit, information of the unknown script to a server, thereby enabling the server to categorize the unknown script as an approved script or a rejected script.

6. The method of claim 5 further comprising receiving, by the processing unit, from the server, second information enabling determination if the unknown script is an approved script or a rejected script, wherein the second information includes (a) at least one update to the first list or to the second list and wherein the processing unit is further configured to apply the update, or (b) at least one of an updated first list or an updated second list.

7. The method of claim 6 wherein the second information is obtained from the server by javascript code received in a response to a web-page request by the web-browser of the client device, wherein the javascript code prevents introduction of the rejected scripts into a Document Object Model (DOM) of the given webpage on the given web-browser, thereby preventing execution of the rejected scripts, and wherein the javascript code is executed by the web-browser before attempting execution of any of the rejected scripts.

8. The method of claim 5 wherein the first list is created by the server performing the following:
generating a plurality of requests for a given webpage, each request having at least one unique parameter value of one or more parameters that can affect the response of a web server;
sending the requests to the web server;
receiving, in response to each request, a corresponding response; and
generating, by analysis of the responses, the first list.

9. A system comprising at least one processing unit, the processing unit configured to:
provide a first list of identifiers of approved scripts approved for executing by web-browsers on a plurality of client devices and a second list of identifiers of rejected scripts not approved for executing by the web-browsers on the client devices, wherein an attempt to execute, by the web-browsers on the client devices, an approved script having an identifier included in the first list will be allowed and an attempt to execute, by the web-browsers on the client devices, a rejected script having an identifier included in the second list will be blocked;
in response to execution of a script validation software on any given client device of the client devices:
send the first list and the second list to the given client device;
receive from the given client device, information of an unknown script executed on the given client by an approved script having an identifier included in the first list, the information including at least an identifier of the unknown script not included in the first list or in the second list; and
update the first list by inserting the identifier of the unknown script thereto upon approval of the unknown script by a user, or updating the second list by inserting the identifier of the unknown script thereto upon rejection of the unknown script by the user.

10. The system of claim 9 wherein the processing unit is further configured to send, to at least one client device of the client devices, second information enabling determination if the unknown script is an approved script or a rejected script, wherein the second information includes (a) at least one update to the first list or to the second list, or (b) at least one of an updated first list or an updated second list.

11. The system of claim 10 wherein the second information is sent in a response to a request by a given web-browser of the client device, wherein the request is generated by javascript code executed on the client device, the javascript code preventing introduction of the rejected scripts into a Document Object Model (DOM) of the given webpage on the given web-browser, thereby preventing execution of the rejected scripts, and wherein the javascript code is designed to be executed by the web-browser before attempting execution of any of the rejected scripts.

12. The system of claim 9 wherein the first list is created by the processing unit performing the following:
generating a plurality of requests for a given webpage, each request having at least one unique parameter value of one or more parameters that can affect a corresponding response of a web server;
sending the requests to the web server;
receiving, in response to each request, a corresponding response; and
generating, by analysis of the responses, the first list.

* * * * *